Nov. 13, 1951     L. W. WIGHTMAN     2,575,153

TAPERED ROTOR FOR UNIT BEARING MOTORS

Filed Nov. 21, 1950

Inventor:
Lawrance W. Wightman,
by    Ernest C. Britton
His Attorney.

Patented Nov. 13, 1951

2,575,153

UNITED STATES PATENT OFFICE 2,575,153

TAPERED ROTOR FOR UNIT BEARING MOTORS

Lawrance W. Wightman, Fort Wayne, Ind., assignor to General Electric Company, a corporation of New York Application November 21, 1950, Serial No. 196,843

9 Claims. (Cl. 171—252)

My invention relates to dynamoelectric machines and more particularly to an improved unit-bearing type machine having a non-uniform air gap.

Ordinarily the walls of the air gap of a dynamoelectric machine are not perfectly smooth and there are slight variations in the air gap resulting from eccentricity and roughness of the individual laminations. The magnetic flux in the air gap creates a force tending to attract the rotor toward the stator and where the air gap is perfectly uniform this force nuetralizes itself. Where there are imperfections in the air gap wall, however, this force does not exactly neutralize itself and this force, when combined with shaft wobble which is the result of bearing clearance, may cause the end of the rotor stacking remote from the bearing to approach, or to strike, the stator. Flux therefore tends to concentrate at the end of rotor stacking remote from the bearing and because of the greater moment arm causes additional eccentricity of the movement of the rotor. Thus it is seen that the deflecting tendency of the rotor is cumulative.

An object of my invention is to provide an improved unit-bearing type dynamoelectric machine.

Another object of my invention is to provide an improved unit-bearing type dynamoelectric machine having a wider air gap at the end of the rotor remote from the bearing than at the end adjacent thereto.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
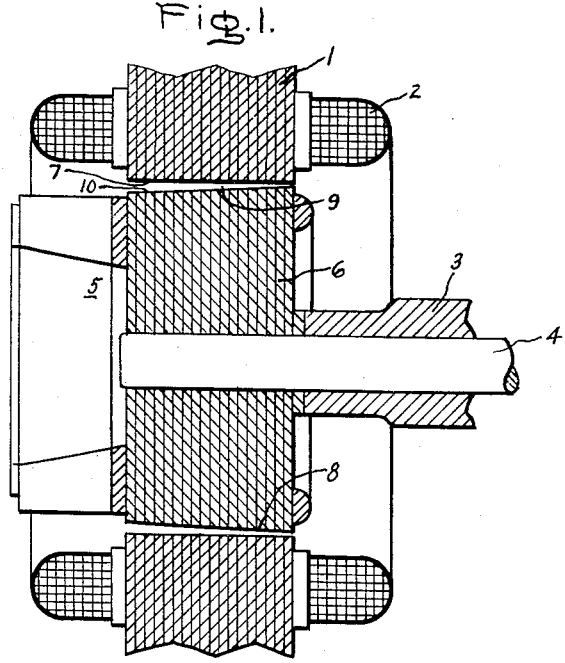
Figure 2:
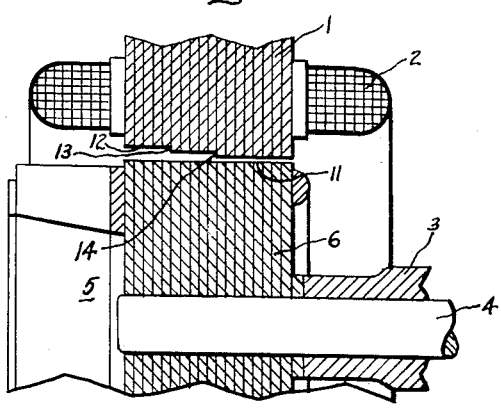

In the drawing, Fig. 1 is a fragmentary sectional view of a unit bearing dynamoelectric machine provided with an embodiment of my invention; and Fig. 2 is a fragmentary sectional view of a unit bearing dynamoelectric machine showing another embodiment of my invention.

In accordance with my invention, I provide a unit-bearing dynamoelectric machine having an air gap of greater width at the end of the rotor remote from the bearing support than at the end adjacent thereto. Either the surface of the stator or the rotor adjacent the air gap may be tapered or stepped to provide the desired variation in the air gap. The variation may extend over the entire length of the air gap or may be for only a portion thereof.

Referring to the drawing, I have shown a unit-bearing type dynamoelectric machine which is provided with two members of magnetic material having substantially cylindrical adjacent walls defining an air gap therebetween. The outer of these two relatively rotatable members is formed as a substantially stationary member having a core 1 provided with suitable winding 2. The outer member of the machine provides a suitable bearing construction 3 which serves to support the shaft 4 of the inner member. Rigidly secured to shaft 4 is rotatable member 5 having a core 6 of magnetic material. Inner cylindrical wall 7 of the core 1, and the outer peripheral wall 8 of core 6 define air gap 9. Cores 1 and 6 are ordinarily made of laminated material.

Referring to Fig. 1, I have shown an embodiment of my invention wherein the rotor core 8 is tapered, as at 10, to provide a wider air gap at the end of the rotor remote from the bearing than at the end adjacent thereto. In order to provide a motor having substantially the same motor output as a motor having a non-tapered air gap, the rotor is made so that the average air gap is the same as in a normal motor. That is to say, the taper is made so that the original rotor diameter is maintained at the longitudinal center of the air gap. A very small air gap at the end of the rotor adjacent to the bearing is not objectionable since the resultant arm of the air gap force of the flux concentrated at this point is very small due to the proximity of the bearing support resulting in a small rotor deflecting movement. Thus the resultant flux concentration is arbitrarily shifted towards the end of the rotor adjacent to the bearing support. This position of flux concentration is maintained even though the movement of the rotor becomes eccentric. Also there is no danger of the rotor striking the stator even when longer stackings are used because of added clearance at the end of the rotor remote from the bearing support. The amount of taper will depend upon the size of the motor and the length of the stacking. As an example, an overall taper of .010 inch has been found to be satisfactory on motors of fractional horsepower sizes having a normal air gap of .015 inch. Obviously different amounts of taper would be required on different sizes of motors.

Referring now to Fig. 2, I have been shown a modification of my invention wherein the outer peripheral wall 11 of the rotor is non-tapered and thus cylindrical. In accordance with this embodiment, the non-uniformity of the air gap is the result of the variation in the diameter of inner peripheral wall 12 of core 1. As illustrated, I have shown a stepped construction which extends over only a portion of the surface 12. Steps 13 and 14 are provided to increase the air gap between the rotor and stator at the end remote from the bearing. The result is substantially the same as if a taper had been used over only a portion of the stator inner periphery 12. While any eccentricity of the rotation of the rotor will result in a concentration of the resultant air gap force at step 14, this construction may be preferable where an extremely high air gap flux is necessary for the operation of the dynamoelectric machine.

It thus becomes apparent that the use of my construction will result in a unit-bearing dynamoelectric machine having smoother operation and also one in which a longer stacking length can be used and therefore a greater horsepower obtained from a given motor diameter. Likewise because the deflecting moment caused by the resultant air gap forces is reduced, there is less bearing load and thus less bearing friction. This is quite important in very small motors where bearing friction greatly reduces the available starting torque and may be 5 or 10 per cent of motor output.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States:

1. In a unit bearing dynamoelectric machine, concentrically arranged rotor and stator members defining an annular air gap, and a bearing for supporting said rotor, said air gap having greater width at the end remote from said bearing than at the end adjacent thereto.

2. In a unit bearing dynamoelectric machine, concentrically arranged rotor and stator members defining an annular air gap, and a bearing for supporting said rotor, said rotor having its air gap surface tapered away from said bearing whereby said air gap is of greater width at the end remote from said bearing than at the end adjacent thereto.

3. In a unit bearing dynamoelectric machine, a rotor and a stator defining an annular air gap, and a bearing for supporting said rotor, said stator being tapered away from said bearing to provide an air gap of greater width at the end remote from said bearing than at the end adjacent thereto.

4. In a unit bearing dynamoelectric machine, concentrically arranged rotor and stator members defining an annular air gap, and a bearing for supporting said rotor, said rotor having a tapered portion on the outer periphery thereof whereby said air gap has a greater width at the end remote from said bearing than at the end adjacent thereto.

5. In a unit bearing dynamoelectric machine, a rotor and a stator defining an annular air gap, and a bearing for supporting said rotor, said stator having a tapered portion on its surface adjacent said air gap to provide an air gap of greater width at the end remote from said bearing than at the end adjacent thereto.

6. In a unit bearing dynamoelectric machine, concentrically arranged rotor and stator members defining an annular air gap, and a bearing for supporting said rotor member, one of said members having its air gap surface tapered to provide an air gap of non-uniform reluctance along the axis of said motor.

7. In a unit bearing dynamoelectric machine, concentrically arranged rotor and stator members defining an annular air gap, and a bearing for supporting said rotor member, one of said members having its air gap surface tapered away from said bearing to provide an air gap of greater reluctance at the end remote from the bearing thereof than at the end adjacent thereto.

8. In a unit bearing dynamoelectric machine, concentrically arranged rotor and stator members having adjacent surfaces defining an annular air gap, and a bearing for supporting said rotor, said surface being more closely spaced adjacent said bearing than at the edge remote therefrom.

9. In a unit bearing dynamoelectric machine, a rotor and a stator defining an air gap, and a bearing for supporting said rotor, the inner peripheral surface of said stator being stepped to provide an air gap of greater width at the end remote from said bearing than at the end adjacent thereto.

LAWRANCE W. WIGHTMAN.

REFERENCES CITED

The following references are of record in the file of this patent:

UNITED STATES PATENTS

| Number | Name | Date |
|---|---|---|
| 2,480,825 | Adolph | Sept. 6, 1949 |